3,706,809
PROCESS FOR PREPARING HIGHLY REACTIVE ORGANO-MAGNESIUM COMPOUNDS
Tatsuo Moroe, Akira Komatsu, Susumu Akutagawa, and Toshiaki Sakaguchi, Tokyo, and Hirokazu Matsuyama, Yokohama, Japan, assignors to Takasago Perfumery Co., Ltd., Tokyo, Japan
No Drawing. Filed Sept. 17, 1970, Ser. No. 73,176
Int. Cl. C07f 3/02
U.S. Cl. 260—665 R  7 Claims

ABSTRACT OF THE DISCLOSURE

A process for the preparation of a highly reactive organo-magnesium compound which comprises reacting a conjugated diene compound with metallic magnesium in a solvent selected from the group consisting of an ether compound and a mixture of said ether compound with a Gregnard reagent inactive solvent, in the presence of a Lewis acid catalyst with the proviso that the Lewis acid catalyst may not be a catalyst of metals belonging to Group I-A and Group II-A of the Periodic Table, to thereby directly combine said conjugated diene compound with said metallic magnesium with the further proviso that said conjugated diene compound does not contain conjugated double bonds which are stabilized in the ring of a cyclic compound.

BACKGROUND OF THE INVENTION

Field of the invention

The present invention relates to a process for the preparation of a highly reactive organo-magnesium compound from a conjugated diene compound and a metallic magnesium.

Description of the prior art

The reaction of a conjugated diene compound with magnesium has been disclosed in the past (see, for example, U.S. Pat. Nos. 3,351,646, Ramsden, and 3,388,179, Ramsden et al.). The prior art methods disclosed in these patents involve the reaction of a conjugated diene such as isoprene with magnesium in the absence of a catalyst at an elevated temperature for a period of time of as long as 32 hours to give an organo-magnesium compound in which 2 moles of the conjugated diene is combined wtih 1 g.-atom of magnesium. The present invention, however, is entirely different from Ramsden's method not only from a process viewpoint but also since the structure of the product compound is different. According to the process of this invention, the diene compound can be reacted with the magnesium under much milder reaction conditions using the above-mentioned catalyst and the product organo-magnesium compound is characterized in its chemical configuration in which one diene component is combined with one atom of magnesium. It is also a unique feature of this invention that the organo-magnesium compound which is obtained by the present process has a unique and very high reactivity compared to that obtained by the prior art processes; for example, it exhibits a reactivity as a divalent magnesium compound.

SUMMARY OF THE INVENTION

The present invention provides a process for the preparation of a highly reactive organo-magnesium compound which comprises reacting a conjugated diene compound (excluding those compounds having conjugated double bonds which are present, for example, as stabilized linkages in a ring of a cyclic compound) with metallic magnesium in a solvent selected from the group consisting of an ether compound and a mixture of the ether compound, with a Grignard reagent inactive solvent using a Lewis acid catalyst (excluding the Lewis acids of metals belonging to Group I-A and Group II-A of the Periodic Table) to thereby directly combine the diene compound with the magnesium.

DETAILED DESCRIPTION OF THE PREFERRED EMBODIMENTS

The present invention is based on the discovery that the above-mentioned conjugated diene compound can be directly combined with magnesium metal when both reactants are reacted in the above-mentioned solvent using a Lewis acid catalyst to form a highly reactive organo-metallic compound which exhibits similar reactivity to, but which is more versatile than, a Grignard reagent.

Among the conjugated diene compounds to be used as the starting material of the process of this invention, there may be used any conjugated dienic compound with the proviso that the conjugated double bonds should not be those which are stabilized in the ring of cyclic carbon compounds, for example, the double bonds in the conjugated relation in a benzene ring.

Examples of suitable conjugated diene compounds include, for example, butadiene, 1,1-dimethyl butadiene, 2,3-dimethyl butadiene, 1,4-diphenyl butadiene, isoprene, pentadiene-1,3, hexadiene-1,3, 2,3-dimethyl hexadiene-1,3, heptadiene-1,3, octadiene - 1,3, 2 - methyl - 6 - methylene-octadiene-2,7, nonadiene-1,3, decadiene-1,3, undecadiene-1,3, paramenthadiene-3,8, 2,6-dimethyl-nonatriene-2,6,8, allo-ocimene, etc.

The metallic magnesium to be used in the process of this invention preferably has a large surface area with a fresh metallic surface, and suitably includes magnesium ribbon, foil and dust.

The catalyst to be used in this invention is a so-called Lewis acid catalyst, and typically includes such Lewis acids as halides, acetates, nitrates, alcoholates of metals belonging to Group I-B, Group II-B, Group III-A, Group III-B, Group IV-A, Group IV-B, Group V-A, Group V-B, Group VI-A, Group VI-B, Group VII-A, Group VII-B, and Group VIII of the Periodic Table. Illustrative of preferred Lewis acids are, for example, titanium tetrachloride, arsenic trichloride, antimony pentachloride, zinc chloride, aluminum chloride, cupric chloride, nickel chloride, palladium chloride, ferric chloride, stannic chloride, ferric nitrate, cupric acetate, an ether complex of boron trifluoride and aluminum isopropylate.

As the solvent to be used in this invention, there may be illustrated: anhydrous ether compounds such as ethers, dioxanes, tetrahydrofuran, 1,2 - dimethoxy ethane, 2-methyl tetrahydrofuran, etc., and a mixture of these ethers with Grignard reagent inactive solvents such as hydrocarbons; e.g., benzene, toluene, n-hexane, isooctane, etc.; hexamethyl phosphoramide, tertiary amines, etc.

Since the organo-magnesium compound to be prepared according to the present invention is highly reactive, the reaction is preferably carried out under anhydrous conditions under vacuum or in an inert gas atmosphere. It is preferred to add both reactants to the solvent in such a ratio that one mole of metallic magnesium is added per mole of the conjugated diene compound. The solvent is added in an amount sufficient to smoothen the reaction under stirring, usually 100 ml. per 1 gram-atom of magnesium. The amount of the Lewis acid catalyst to be added is preferably within the range of about 0.05 to 0.1 mole per mole of magnesium.

As discussed hereinabove, the reaction of the present invention is typically carried out by first adding the conjugated diene compound, metallic magnesium and the Lewis acid to the solvent, then heating the resulting mixture to an appropriate temperature, preferably to about 50 to 80° C. while stirring for a suitable period of time, preferably for about 4–7 hours, to thereby complete the reaction as evidenced by the disappearance of metallic magnesium which indicates the formation of the organo-magnesium compound.

In view of the fact that the organo-magnesium compounds thus prepared are so highly reactive, they are not isolated nor are their chemical configurations determined. This is not surprising considering the fact that Grignard reagents, which have been known for a much longer period of time have never been isolated nor have accurate formulae therefor been determined; but instead, only hypothetical structural formulae proposed. The organo-magnesium compound of this invention is considered to have the following hypothetical structure which has been assumed from the facts involving the disappearance of metallic magnesium during its preparation to form a direct combination with the conjugated diene compound and its reactivity as well as the types of the reaction products derived therefrom:

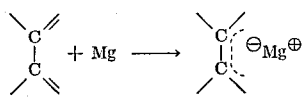

The most characteristic property of the organo-magnesium compounds of this invention is that it is highly reactive (as are Grignard reagents), and hence they readily react with a variety of compounds which are generally reactive with Grignard reagents, such as water, carbon dioxide, oxygen, oxide compounds and carbonyl compounds, etc. Moreover, since the organo-magnesium compounds of this invention are divalent or bifunctional, unlike monovalent or monofunctional Grignard reagents, they exhibit a reactivity as if they had two Grignard reagents in the molecule. For this reason, the organo-magnesium compounds prepared according to the process of this invention show a surprisingly diverse form of reactivity, which allows for the synthesis of a great many useful compounds.

As described hereinabove, the organo-magnesium compounds prepared in accordance with the present invention are very useful in the synthesis of a variety and great number of useful substances.

According to the process of this invention, the organo-magnesium compound is obtained in the form of its solution which itself is highly reactive and can be used either immediately or after concentration for subsequent reactions.

The following examples are given only to illustrate the present invention, and are not to be considered to limit the scope thereof.

EXAMPLE 1

A 500 ml. reaction flask fitted with a thermometer, condenser, stirrer and a dropping funnel was charged with 30 g. of 2-methyl-6-methylene-octadiene-2,7 (known by the name of myrcene), 100 ml. of tetrahydrofuran, 6 g. of magnesium dust and 1 g. of anhydrous zinc chloride. The charged mixture was then heated at 60–65° C. for 6 hours in a nitrogen stream under anhydrous conditions to give an organomagnesium compound with the disappearance of the magnesium dust. The yield determined by quantitative analysis according to Gilman's method was 85%. Though it is more desirable to use the product compound, as it is formed, immediately for subsequent reaction, it can be stored or preserved in a sealed container under anhydrous conditions in an inert gas atmosphere. The product compound can also be stored, under the same conditions as above, in the form of a dark brown paste which is obtained after the recovery of the solvent tetrahydrofuran under vacuum.

EXAMPLE 2

An organo-magnesium compound was prepared by a method similar to that of Example 1 except that 1 g. of anhydrous ferric nitrate was used as the catalyst. The yield determined by Gilman's quantitative analysis was 87%.

EXAMPLE 3

A mixture of 15 g. of 1,3-pentadiene (known by the name of piperylene) and 4 g. of magnesium dust was reacted using 0.5 ml. of titanium tetrachloride as the catalyst in 80 ml. of dimethoxyethane, in a pressure glass tube at 70° C. for 5 hours to give an organo-magnesium compound with the disappearance of magnesium dust. The yield of the product, determined by Gilman's quantitative analysis method, was 97%. This product was storable in a sealed state under an inert gas, and the dark brown paste of the organo-magnesium compound obtained after the recovery of the solvent 1,2-dimethoxyethane can be similarly preserved and used at any desired time.

EXAMPLE 4

An organo-magnesium compound was obtained according to the method of Example 1 by reacting 30 g. of 1,1-dimethyl butadiene and 8 g. of magnesium dust in 100 ml. of 2-methyl tetrahydrofuran using 1 g. of palladium chloride as the catalyst. The yield determined by Gilman's method reached 92%. The reaction liquid so obtained and the pasty organo-magnesium compound obtained after the removal of the solvent are both storable under the same conditions as shown in Example 1.

EXAMPLE 5

An organo-magnesium compound was prepared by the method of Example 1 by reacting 20 g. of butadiene and 6 g. of magnesium dust in 50 ml. of tetrahydrofuran and 50 ml. of benzene using 1.5 g. of aluminum isopropylate as the catalyst. The yield determined by Gilman's method was 78% in purity. This product compound was stable either in the form of its solution or in the form of paste obtained after the solvent recovery.

EXAMPLE 6

According to the method of Example 1, 30 g. of paramenthadiene was reacted with 6 g. of magnesium dust in 30 ml. of tetrahydrofuran and 70 ml. of benzene using 1 g. of arsenic trichloride as the catalyst to form an organo-magnesium compound. The analysis of this compound by Gilman's method showed a purity of 90%, and the compound could be preserved in the form of either the solution or as a paste obtained after solvent recovery for use in subsequent reactions at any desired time.

EXAMPLE 7

The procedure of Example 5 was repeated except 1.5 g. of antimony pentachloride was used as the catalyst to give an organo-magnesium compound of butadiene. The yield of this product, determined by Gilman's method, was 83% in purity. The product was also preservable in a manner similar to Example 1.

Examples of the application of the highly reactive organo-magnesium compound of this invention are given in the following referential examples.

Referential Example 1

A solution of the organo-magnesium compound obtained in Example 1 was cooled to −10° C., and 10 g. of propylene oxide was added dropwise to the solution with violent exothermic reaction. The reaction terminated at the same time as the completion of the addition of the propylene oxide. After stirring for an additional period of time (2 hours), the product was decomposed by adding dilute hydrochloric acid, and the oily reaction product was separated to give a product oil boiling at 95–99° C./2 mm. Hg in a yield of 75%. The product was identified by gas-chromatography, infrared absorption spectrum and nuclear magnetic resonance to be 4,9-dimethyl-5-methylene-decane-2-ol.

Referential Example 2

To a solution of the organo-magnesium compound obtained in Example 2 was added 10 g. of acetone and reacted according to the method described in Referential Example 1. The reaction product comprised 10 g. of 2,3,8-trimethyl-4-methylenenonane boiling at 80–82° C./3 mm. Hg, and 7 g. of 2,5-dimethyl-3-(5-methyl-1-methylenehexene-4)-hexanediol-2,5, boiling at 135–140° C./2 mm. Hg. The latter compound is a product of the bifunctional reaction of the organo-magnesium compound with acetone.

Referential Example 3

Formaldehyde was added to a solution in 100 ml. benzene of the pasty organo-magnesium compound of 1,3-pentadiene obtained in Example 3. The resulting reaction product was decomposed with dilute hydrochloric acid and treated according to the method of Referential Example 1 to give 7 g. of product (yield: 52%) with a boiling point of 52–55° C./30 mm. Hg, which was determined to be 2-ethylbutene-3-ol-1.

We claim:

1. A process for the preparation of a highly reactive organo-magnesium compound which comprises reacting a conjugated hydrocarbon diene with metallic magnesium in a solvent selected from the group consisting of an ether and a mixture of said ether with a Grignard reagent inactive solvent, in the presence of a Lewis acid catalyst of metal halides, acetates, nitrates or alcoholates with the proviso that said Lewis acid catalyst may not be a catalyst of metals belong to Group I-A and Group II-A of the Periodic Table, to thereby directly combine said conjugated diene with said metallic magnesium, with the further proviso that said conjugated diene does not contain conjugated double bonds which are stabilized in the ring of a cyclic compound and wherein one mole of said conjugated diene is reacted with each mole of said metallic magnesium, and wherein from 0.05 to 0.1 mole of said Lewis acid catalyst is employed per 1 mole of said metallic magnesium.

2. A process as in claim 1, wherein said conjugated diene compound, said metallic magnesium and said catalyst are added to said solvent and the resulting mixture is heated to a temperature of from 50 to 80° C. while stirring for a period of time of from 4 to 7 hours.

3. A process as in claim 1, wherein said conjugated diene compound is selected from the group consisting of butadiene, 1,1-dimethyl butadiene, 2,3-dimethyl butadiene, 1,4-diphenyl butadiene, isoprene, pentadiene-1,3, hexadiene-1,3, 2,3-dimethyl hexadiene-1,3, heptadiene-1,3, octadiene-1,3, 2-methyl-6-methylene-octadiene-2,7, nonadiene-1,3, decadiene-1,3, undecadiene-1,3, paramenthadiene-3,8, 2,6-dimethylnonatriene-2,6,8 and allo-ocimene.

4. A process as in claim 1, wherein said Lewis acid catalyst is selected from the group consisting of titanium tetrachloride, arsenic trichloride, antimony pentachloride, zinc chloride, aluminum chloride, cupric chloride, nickel chloride, palladium chloride, ferric chloride, stannic chloride, ferric, nitrate, cupric acetate, an ether complex of boron trifluoride and aluminum isopropylate.

5. A process as in claim 1, wherein said solvent is selected from the group consisting of ethers and mixtures thereof with benzene, toluene, n-hexane, isooctane, hexamethyl phosphoramide and tertiary amines.

6. A process as in claim 5, wherein said ethers are selected from the group consisting of dioxanes, tetrahydrofuran, 1,2-dimethoxyethane and 2-methyl tetrahydrofuran.

7. The organo-magnesium compound produced by the process of claim 2.

References Cited

UNITED STATES PATENTS

| | | | |
|---|---|---|---|
| 3,509,067 | 4/1970 | Bostick | 260—665 R |
| 3,168,582 | 2/1965 | Aufdermarsh | 260—665 G |
| 3,226,450 | 12/1965 | Blazejak et al. | 260—665 G |
| 3,388,179 | 6/1968 | Ramsden | 260—665 G |

OTHER REFERENCES

Kharasch et al.: Grignard Reactions of Nonmetallic Substances, Prentice-Hall Inc., New York, N.Y., 1954, pp. 8–11 and 55–6.

Moeller: Inorganic Chemistry, John Wiley and Sons, New York, N.Y., 1952, pp. 326–9.

JAMES E. POER, Primary Examiner

A. P. DEMERS, Assistant Examiner

U.S. Cl. X.R.

260—631.5, 632 R, 635 R, 665 G, 666 A